United States Patent Office 3,541,094
Patented Nov. 17, 1970

3,541,094
4-(SUBSTITUTED AMINO)-QUINAZOLINES
Karl Lutz, Basel, and Rupert Schneider, Riehen, Switzerland, assignors to Sandoz Ltd., Basel, Switzerland, a corporation of Switzerland
No Drawing. Filed Apr. 20, 1967, Ser. No. 632,192
Claims priority, application Switzerland, Apr. 26, 1966, 6,060/66; May 18, 1966, 7,208/66; Dec. 1, 1966, 17,191/66
Int. Cl. C07d 51/48
U.S. Cl. 260—256.4      4 Claims

ABSTRACT OF THE DISCLOSURE

Compositions containing liquid or solid 4-aminoquinazolines are used to control plant pests and tests are given showing their fungicidal contact and systemic effect with barley, vines, potatoes and beans and the acaricidal and ovicidal effect on spider mites with beans. New pesticidally active 4-aminoquinazolines substituted on the amino radical with one or two lower alkyl ($C_3$ to $C_{14}$) radicals are produced by methods known per se.

BACKGROUND OF THE INVENTION

The production of 4-aminoquinazolines and their derivatives has been described in the literature on the subject on various occasions. These compounds may easily be obtained by reacting 4-halogenoquinazolines with the corresponding amines [see, e.g., J. Am. Chem. Soc. 68, 1306 (1946), J. Chem. Soc. 1944, 615]. However, it is likewise possible to produce them directly from the corresponding 4-quinazoline by reaction with the required amine [see, e.g., Chemical Abstracts 55, 5516$^b$ (1961)] or by the reaction of a 4-alkylmercaptoquinazoline with amines [see, e.g., J. Org. Chem. 11, 349 (1946)].

About the use of 4-aminoquinazolines the following may be found in the literature on the subject:

4-ethylaminoquinazoline and 4-diethylaminoquinazoline are described in U.K. patent specification No. 822,069 and stated to be herbicidally effective compounds. In Belgian patent specification No. 646,850 4-($\beta$-dimethylamino-ethyl-amino)-quinazolines are mentioned as analgesics.

Derivatives of 4-dimethylaminoquinazolines are also stated to be of therapeutic interest according to the U.K. patent specification No. 857,362.

It has now been found surprisingly that certain compounds of this class and their salts have excellent fungicidal and acaricidal/ovicidal properties and that they may be worked up in the usual way to fungicidally and acaricidally effective preparations, e.g. by converting them into dusting agents, emulsifiable liquid preparations or into other forms usual in agrochemistry.

SUMMARY OF THE INVENTION

The present invention provides a process for controlling plant pests, characterized in that a compound of the formula I

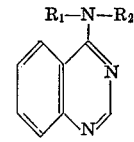

(I)

wherein $R_1$ represents an optionally substituted alkyl or alkenyl radical with up to 18 carbon atoms and $R_2$ represents a hydrogen atom or an optionally substituted alkyl or alkenyl radical with up to 18 carbon atoms, or a salt thereof is applied to a locus which is to be protected from plant pests.

The present invention also provides a composition for controlling pests comprising a compound of Formula I above or a salt thereof and an inert carrier therefor.

Especially suitable are the salts of the compounds of Formula I with strong mineral acids, e.g. the chlorides, sulphates or primary phosphates; however, salts of bases with organic acids are likewise suitable, e.g. with optionally substituted monocarboxylic acids, e.g. low molecular weight alkane carboxylic acids and halogeno alkane carboxylic acids (e.g. formic acid, acetic acid or chloroacetic acid), with optionally substituted polycarboxylic acids (e.g. oxalic acid, tartaric acid or citric acid) or with optionally substituted mono- or disulphonic acids of the aliphatic or aromatic series (e.g. low molecular weight alkane sulphonic acids, methane sulphonic acid, benzenemono- or disulphonic acid, 4-methylbenzene - sulphonic acid).

The simplest way of producing these salts consists in that the bases are stirred into a suitable solvent, e.g. a low molecular weight alcohol or water, and dissolution is effected with the addition of the equivalent amount of acid, if necessary while heating, and the solvent is then removed, e.g. by distilling it off at a reduced pressure, drying being effected at a temperature of 50–150° C. The resulting crude salts may be purified by washing with ether, acetone or other similarly acting solvents or by recrystallization from a solvent therefor, e.g. dioxan or acetonitrile. Easily volatilized impurities may be removed in a high vacuum from those salts which do not crystallize easily.

Especially suitable compounds of the Formula I are enumerated by way of example in the following Table 1 in which only the radicals $R_1$ and $R_2$ of the Formula I are defined; all the methods described above are suitable for producing the compounds described in Table 1, but the actual method used by us is the one starting with 4-chloroquinazoline and an amine of the formula

according to the method described in J. Am. Chem. Soc. 68 (1946), 1306. The temperatures are stated in degrees centigrade and the melting points are not corrected.

TABLE 1

| Compound No. | $R_1$ | $R_2$ | M.P., °C. | | N, percent | C, percent | H, percent | Described in— |
|---|---|---|---|---|---|---|---|---|
| 1 | n-$C_3H_7$— | —H | 134 | Calc | 22.4 | 70.6 | 7.0 | |
| | | | | Found | 21.9 | 69.5 | 6.8 | |
| 2 | iso-$C_3H_7$— | —H | 173 | Calc | 22.4 | 70.6 | 7.0 | |
| | | | | Found | 22.5 | 70.3 | 7.1 | |
| 3 | n-$C_4H_9$— | —H | 116 | | | | | J. Am. Soc. 68, 1306. |
| 4 | sec.-$C_4H_9$— | —H | 198–200 | Calc | 20.9 | 71.8 | 7.5 | |
| | | | | Found | 20.9 | 71.4 | 7.6 | |
| 5 | iso-$C_4H_9$— | —H | 134 | Calc | 20.9 | 71.8 | 7.5 | |
| | | | | Found | 21.1 | 72.1 | 7.8 | |

TABLE 1—Continued

| Compound No. | R₁ | R₂ | M.P., °C. | | N, percent | C, percent | H, percent | Described in— |
|---|---|---|---|---|---|---|---|---|
| 6 | ⟨phenyl⟩—CH₂CH₂— | —H | 179 | Calc.<br>Found | 16.9<br>16.8 | 76.1<br>74.7 | 6.4<br>6.0 | |
| 7 | n-C₈H₁₇— | —H | 56 | Calc.<br>Found | 16.3<br>15.9 | 74.9<br>74.2 | 9.0<br>8.0 | |
| 8 | n-C₁₀H₂₁— | —H | 80–81 | Calc.<br>Found | 14.7<br>14.2 | 76.0<br>74.6 | 9.4<br>9.4 | |
| 9 | n-C₁₈H₃₇— | —H | 104 | Calc.<br>Found | 10.6<br>9.9 | 78.6<br>76.5 | 10.4<br>10.5 | |
| 10 | CH₃— | CH₃— | Liquid | Calc.<br>Found | 24.3<br>23.1 | 69.0<br>69.4 | 6.9<br>6.4 | |
| 11 | C₂H₅— | C₂H₅— | Liquid | | | | | U.K. Pat. No. 822,069. |
| 12 | n-C₄H₉— | n-C₄H₉— | Liquid | Calc.<br>Found | 16.3<br>16.4 | 74.9<br>74.5 | 9.0<br>9.0 | |
| 13 | iso-C₄H₉— | iso-C₄H₉— | Liquid | Calc.<br>Found | 16.3<br>16.6 | 74.9<br>73.9 | 9.0<br>8.7 | |
| 14 | —C(CH₃)₃ | —H | 141 | Calc.<br>Found | 20.9<br>21.2 | 71.7<br>72.0 | 7.5<br>7.6 | |
| 15 | —C₅H₁₁—n | —H | 110 | Calc.<br>Found | 19.6<br>20.0 | 72.9<br>73.2 | 8.0<br>8.2 | |
| 16 | —CH₂—CH=CH₂ | —H | 140 | Calc.<br>Found | 22.7<br>23.0 | 71.4<br>71.6 | 6.0<br>6.5 | |
| 17 | —C₆H₁₃—n | —H | 107–108 | Calc.<br>Found | 18.4<br>18.8 | 73.4<br>73.6 | 8.4<br>8.5 | |
| 18 | CH₂—O<br>      \CH—CH₂—<br>CH₂—O/ | —CH₃ | Liquid | Calc.<br>Found | 17.2<br>17.1 | 63.6<br>63.2 | 6.2<br>6.6 | |
| 19 | —C₄H₉—n | —CH₃ | Liquid | Calc.<br>Found | 19.6<br>19.7 | 72.6<br>72.9 | 8.0<br>8.4 | |
| 20 | —CH(C₂H₅)₂ | —H | 174 | Calc.<br>Found | 19.6<br>20.1 | 72.9<br>72.3 | 7.5<br>8.1 | |
| 21 | CH₃<br>\|<br>—CH—C₃H₇—n | —H | 182 | Calc.<br>Found | 19.6<br>20.0 | 72.9<br>73.0 | 7.5<br>8.1 | |
| 22 | —CH₂—CH—C₄H₉—n<br>      \|<br>      C₂H₅ | —CH₂—CH—C₄H₉—n<br>      \|<br>      C₂H₅ | Liquid | Calc.<br>Found | 11.4<br>11.0 | 78.2<br>77.9 | 10.6<br>11.0 | |
| 23 | —C₁₁H₂₃—n | —H | 74–76 | Calc.<br>Found | 14.0<br>14.3 | 76.3<br>76.2 | 9.8<br>9.9 | |
| 24 | —C₉H₁₉—n | —H | 105 | Calc.<br>Found | 15.5<br>15.5 | 75.0<br>74.8 | 9.3<br>9.5 | |
| 25 | —C₁₂H₂₅—n | —H | 72–73 | Calc.<br>Found | 13.4<br>14.3 | 76.7<br>76.2 | 10.0<br>9.9 | |
| 26 | —C₁₄H₂₉—n | —H | 73–75 | Calc.<br>Found | 12.3<br>12.3 | 77.5<br>77.5 | 10.3<br>10.4 | |
| 27 | —C₁₆H₃₅—n | —H | 68–70 | Calc.<br>Found | 11.3<br>11.3 | 78.1<br>78.5 | 10.6<br>11.0 | |
| 28 | —CH—(CH₂)₄—CH₃<br>  \|<br>  CH₃ | —H | 124 | Calc.<br>Found | 17.3<br>17.5 | 74.1<br>74.2 | 8.6<br>9.0 | |
| 29 | —(CH₂)₈—CH=CH—<br>     \|<br>     (CH₂)₇—CH₃ | —H | Liquid | Calc.<br>Found | 10.6<br>9.4 | 79.0<br>77.3 | 10.4<br>11.1 | |

The following examples illustrate the production of the compounds shown in Table 1.

(A) *Compound No. 4.*—70 g. of 4-chloroquinazoline (0.42 mol) are dissolved in 800 ml. of benzene and 70 g. (0.96) mol) of sec.-butylamine of the formula $$H_2N-CH(CH_3)-CH_2-CH_3$$

are added at room temperature while stirring. The reaction mixture is then stirred at 70° for 4 hours. After cooling the precipitate, which is a mixture of the crystalline reaction product and butylamine hydrochloride, is suctioned off, dried, stirred with 800 ml. of water, again suctioned off and dried at 12 mm. of Hg at 60°. The reaction product which has the formula

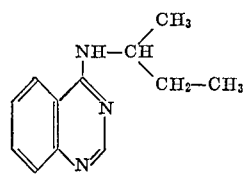

is obtained in almost analytically pure form and may be crystallized from ethanol to purify it further. It is obtained in a yield of 92% of theory (based on the chloroquinazoline); after recrystallization from ethanol it melts at 198–200° (uncorrected). The compounds 1, 3, 6 and 9 are likewise produced in analogous manner.

(B) *Compound No. 4.*—82 g. (0.5 mol) of finely pulverized 4-chloroquinazoline are stirred in an aqueous, approximately 50% solution of 178 g. (2.5 mols) of sec.-butylamine for 12 hours at room temperature, whereafter the resulting crystalline precipitate is suctioned off and recrystallized from ethanol. The same active ingredient as described in Example (A) above is obtained with a net yield of about 60% of theory based on the chloroquinazoline.

In analogous manner there are produced likewise compounds Nos. 2 and 5.

(C) *Compound No. 2.*—82 g. of 4-chloroquinazoline (0.5 mol) are dissolved in 400 ml. of ethanol and a mixture of 50.5 g. (0.5 mol) of triethylamine and 29.5 g. (0.5 mol) of isopropylamine are added dropwise fairly rapidly while stirring, whereupon stirring is continued for a further hour at 30–40°. Thereupon the ethanol is evaporated, the residue stirred with water and recrystallized from ethanol. A compound of the formula

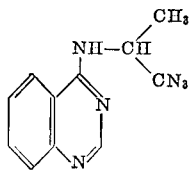

is obtained with a yield of 85% of theory based on the 4-chloroquinazoline. This compound melts at 173°.

(D) *Compound No. 12*.—82 g. (0.5 mol) of 4-chloroquinazoline are dissolved in 400 ml. of ether and a mixture of 50.5 g. (0.5 mol) of triethylamine and 65 g. (0.5 mol) of n-dibutylamine is added dropwise while stirring. Thereupon boiling for 2 hours at reflux is effected, precipitated amine hydrochloride is filtered off and the ethereal filtrate is evaporated to dryness. The residue is taken up in chloroform, washed several times with water and, after evaporating off the chloroform, freed of remaining easily volatilizable materials in a high vacuum at 60° during 1 hour. A compound of the formula

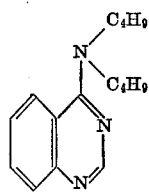

is obtained as a light yellow oil.

Yield: 80% of theory based on the 4-chloroquinazoline.

The compounds Nos. 10 and 11 are obtained in analogous manner.

(E) *Compound No. 25*.—100 g. (0.608 mol) of 4-chloroquinazoline are stirred with 114 g. (0.614 mol) of n-dodecylamine in 500 ml. of xylene. Thereupon 67 g. (0.67 mol) of triethylamine are added, stirring at 50° for 1 hour is effected and then for a further 3 hours at 80°. After cooling the mixture is washed thrice each time with 500 ml. of water and the solvent is distilled off at the water pump (90°/15 mm. of Hg). The remaining residue (which is still liquid at this temperature) is mixed with 300 ml. of petroleum ether and shaking for 30–60 minutes is effected until the product has separated out in the form of fine colourless leaflets after complete cooling. Filtering off is effected and washing with 100 ml. of petroleum ether and drying at 40° in a vacuum. A compound of the formula

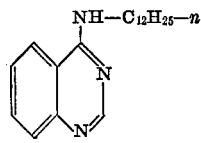

is obtained.

Yield: 92% of theory based on the 4-chloroquinazoline.

This material melts at 72–73°.

In analogous manner the compounds Nos. 7, 8, 23, 24 and 26 are likewise produced.

(F) *Compound No. 13*.—82 g. (0.5 mol) of 4-chloroquinazole together with 130 g. (0.5 mol) of di-isobutylamine in 300 ml. of benzene are heated in an autoclave to 120° for 12 hours. After the resulting amine hydrochloride has been filtered off, the benzene is driven off and the residue taken up in ether. The ethereal solution is washed several times with water, the ether is driven off and the residue kept in a high vacuum for 1 hour at 60°. A compound of the formula

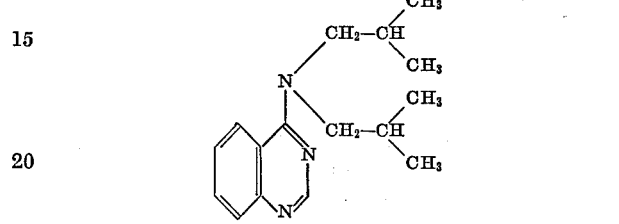

is obtained in the form of an oil.

Yield: 55% of theory based on the 4-chloroquainzoline.

Particularly interesting compounds of the Formula I correspond to the formula

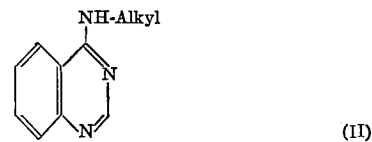

(II)

wherein Alkyl represents an alkyl radical with from 3 to 14 carbon atoms. The compounds of Formula II consist of two sub-groups: the first one with 3 to 5 carbon atoms in the alkyl radical having a pronounced fungicidal effect and the second one containing 7 to 14 carbon atoms in the alkyl radical having a pronounced acaricidal effect.

Specific compounds of the Formula II of importance are, e.g., 4-isopropyl-, 4-sec.-butyl- and 4-n-butyl-quinazoline.

In the following Table 2 the salts listed were produced according to the method described herein. For a certain number of these salts the exact method of manufacture is described after the table. The temperatures are stated in degrees centigrade.

TABLE 2

| Compound No. | Base | Formula | M.P. in °C. | Analysis figures | | | | |
|---|---|---|---|---|---|---|---|---|
| | | | | | C, percent | H, percent | N, percent | Cl, percent | percent |
| 30 | 4 | NH—CH(CH₃)—CH₂—CH₃ quinazoline·HCl | 220-21 | Calc. Found | 60.9 59.8 | 6.7 6.9 | 17.7 17.4 | 14.9 14.9 | |
| 31 | 2 | NH—CH(CH₃)(CH₃) quinazoline·HCl | 242-44 | Calc. Found | 59.2 58.1 | 6.32 6.2 | 18.8 18.8 | 15.9 16.0 | |
| 32 | 15 | NH—C₅H₁₁—n quinazoline·HCl | 162 | Calc. Found | 62.1 61.4 | 7.2 7.1 | 16.7 16.4 | 14.1 14.1 | |

TABLE 2—Continued

| Compound No. | Base | Formula | M.P. in °C. | | C, percent | H, percent | N, percent | Cl, percent | S, percent |
|---|---|---|---|---|---|---|---|---|---|
| 33 | 6 | 4-(NH-CH₂-CH₂-C₆H₅)-quinazoline·HCl | 121 | Calc. Found | 67.3 67.7 | 5.7 5.8 | 14.7 14.2 | 12.4 12.2 | |
| 34 | 17 | 4-(NH-C₆H₁₃-n)-quinazoline·HCl | 163 | Calc. Found | 63.4 63.6 | 7.6 7.5 | 15.8 15.7 | 13.4 13.4 | |
| 35 | 20 | 4-(NH-CH(C₂H₅)₂)-quinazoline·HCl | 240 | Calc. Found | 62.1 61.1 | 7.2 7.2 | 16.7 16.7 | 14.1 13.6 | |
| 36 | 21 | 4-(NH-CH(CH₃)-CH₂-CH₂-CH₃)-quinazoline·HCl | 167 | Calc. Found | 62.1 62.5 | 7.2 7.6 | 16.7 16.7 | 14.1 14.2 | |
| 37 | 4 | [4-(NH-CH(CH₃)-CH₂-CH₃)-quinazoline]₂·H₂SO₄ | 129 | Calc. Found | 57.6 56.9 | 6.0 7.0 | 16.8 16.1 | | 6.4 6.7 |
| 38 | 2 | [4-(NH-CH(CH₃)₂)-quinazoline]₂·H₂SO₄ | 93 | Calc. Found | 55.9 55.2 | 6.9 6.6 | 17.8 17.7 | | 6.8 6.9 |
| 39 | 2 | 4-(NH-CH(CH₃)₂)-2-CH₃-quinazoline·(p-C₆H₄-SO₃H) | 169 | Calc. Found | 60.0 60.0 | 6.1 5.9 | 11.7 11.0 | | 8.6 8.8 |
| 40 | 4 | 4-(NH-CH(CH₃)-CH₂-CH₃)-2-CH₃-quinazoline·(p-C₆H₄-SO₃H) | 187 | Calc. Found | 61.0 61.1 | 6.4 6.0 | 11.2 11.7 | | 8.6 8.5 |
| 41 | 17 | 4-(NH-C₆H₁₃-n)-2-CH₃-quinazoline·(p-C₆H₄-SO₃H) | 78 | Calc. Found | 62.9 62.2 | 6.8 7.6 | 10.4 10.1 | | 8.0 7.6 |
| 42 | 15 | 4-(NH-C₅H₁₁-n)-2-CH₃-quinazoline·(p-C₆H₄-SO₃H) | 73 | Calc. Found | 62.0 62.9 | 6.5 7.0 | 10.8 10.5 | | 8.3 7.8 |

TABLE 2—Continued
| Compound No. | Base | Formula | M.P. in °C. | | C, percent | H, percent | N, percent | Cl, percent | S, percent |
|---|---|---|---|---|---|---|---|---|---|
| | | | | | | Analysis figures | | | |
| 43 | 3 | 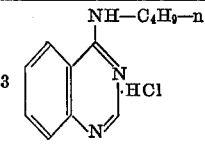 | 218 | Calc<br>Found | 60.8<br>60.4 | 6.7<br>6.7 | 17.7<br>17.6 | | |
| 44 | 17 | 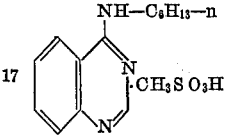 | Resin | Calc<br>Found | 55.9<br>55.1 | 7.14<br>7.4 | 12.9<br>13.3 | | 9.9<br>9.7 |
| 45 | 15 | 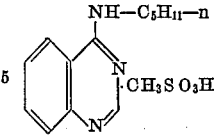 | 100–104 | Calc<br>Found | 54.1<br>54.3 | 6.8<br>6.5 | 13.5<br>13.0 | | 10.3<br>9.9 |
| 46 | 2 | 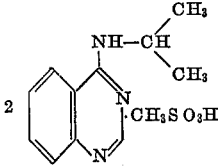 | 131–45 | Calc<br>Found | 37.7<br>36.9 | 6.0<br>5.8 | 14.9<br>15.1 | | 11.3<br>11.2 |
| 47 | 4 | 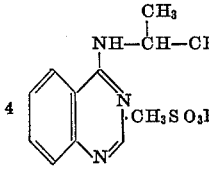 | Resin | Calc<br>Found | 52.5<br>51.8 | 6.4<br>6.7 | 14.1<br>14.0 | | 10.8<br>10.6 |
| 48 | 2 | 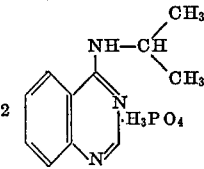 | 250 | Calc<br>Found | 46.4<br>45.9 | 5.6<br>5.3 | 14.8<br>14.5 | | |
| 49 | 4 | 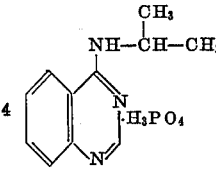 | 222–24 | Calc<br>Found | 48.1<br>47.7 | 6.0<br>5.9 | 14.1<br>13.6 | | |
| 50 | 7 | 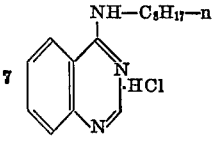 | 165 | Cald<br>Found | 65.6<br>65.1 | 8.2<br>8.2 | 14.4<br>14.6 | 12.1<br>11.9 | |
| 51 | 25 | 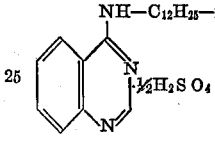 | Oil-wax | | | | | | |
| 52 | 8 | 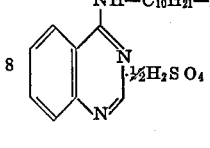 | ...do | | | | | | |

TABLE 2—Continued

| Compound No. | Base | Formula | M.P. in °C. | | C, percent | H, percent | N, percent | Cl, percent | S percent |
|---|---|---|---|---|---|---|---|---|---|
| 53 | 8 | [quinazoline with NH-C₁₀H₂₁-n, CH₃, phenyl-SO₃H] | Oil | Calc. / Found | 65.6 / 65.5 | 7.7 / 8.2 | 9.2 / 9.1 | | 7.0 / 6.8 |
| 54 | 8 | [quinazoline with NH-C₁₀H₂₁-n, CH₃-SO₃H] | Oil | Calc. / Found | 59.8 / 60.0 | 8.2 / 8.1 | 11.0 / 11.2 | | 8.4 / 7.9 |
| 55 | 23 | [quinazoline with NH-C₁₁H₂₃-n, ·HCl] | 168–9 | Calc. / Found | 67.9 / 68.2 | 9.0 / 8.8 | 12.5 / 12.3 | 10.2 / 10.2 | |

(G) Compound No. 31.—9 g. of 4-isopropylamino-quinazoline are added to 100 ml. of ethanol (or 120 ml. of water) and dissolved therein with the addition of 5 g. of 36% hydrochloric acid and the solvent removed at the water pump. The residue is dried at about 120° in a drying oven. In this way 10.8 g. of crude salt having M.P. 239–240° are obtained. By recrystallizing from dioxan the melting point is increased to 242–244°.

(H) Compound No. 37.—5 g. of 4-(2'-butylamino)-quinazoline are added to 50 ml. of water and dissolved therein with the addition of 1.22 g. of 98% sulphuric acid. The water is removed at 60° at the water pump and the residue dried at 120° in a drying oven. After boiling out with ligroin, 5.9 g. of crude salt are obtained; this is washed with ether and then has a melting point of 129°.

(I) Compound No. 50.—7 g. of 4-(n-octylamino)-quinazoline are added to 100 ml. of ethanol and dissolved therein with the addition of 3.5 ml. of 36% hydrochloric acid and the solvent removed at the water pump. The residue is washed with acetone and dried in a drying oven at 130°. 6.5 g. of salt with M.P. 165° are obtained.

(J) Compound No. 41.—5 g. of 4-(n-hexylamino)-quinazoline are dissolved in 50 ml. of ethanol together with 3.9 g. of p-toluene sulphonic acid. The solvent is removed at the water pump and the residue recrystallized from dioxan. 6.2 g. of salt with M.P. 78° are obtained.

(K) Compound No. 46.—5 g. of 4-isopropylamino-quinazoline are added to 50 ml. of ethanol and dissolved therein with the addition of 2.6 g. of methane sulphonic acid, the ethanol removed at the water pump and the residue kept for 1 hour at 120° in a high vacuum. In this way the salt is obtained as a viscous oil which solidifies to a glassy mass after a little while and then melts between 131–145°.

(L) Compound No. 49.—6.0 g. of 4-(2'-butylamino)-quinazoline together with 3.5 g. of 85% orthophosphoric acid are dissolved in 200 ml. of water. Evaporation at the water pump is effected until a moist residue is obtained which is stirred with 5 ml. of acetone, suctioned off and the resulting product is dried at 140° in a drying oven. The yield of salt, M.P. 222–224°, amounts to 6.8 g.

The present invention also includes, as new compounds, those compounds of the Formula I in which the radical $R_2$ signifies a hydrogen atom and $R_1$ signifies an alkyl radical of from 7 to 14 carbon atoms inclusive, and their salts; and in which $R_2$ signifies a hydrogen atom and $R_1$ is selected from iso-propyl, iso-butyl, sec.-butyl, 2-pentyl and 3-pentyl radicals and their salts.

The following Examples 1 and 2 illustrate the production of compositions containing a compound of Formula I or a salt thereof together with an inert carrier.

EXAMPLE 1

25 parts of any of the compounds listed in Tables 1 or 2 which are solid at room temperature are worked up with 3 parts of a surface active alkylphenylpolyglycol ether, 7 parts of pulverulent silicic acid gel and 65 parts of kaolin, using a ball mill, to give a spray preparation capable of being suspended; the active agent content of this preparation amounts to 25%.

EXAMPLE 2

25 parts of any of the compounds listed in Table 1 which are liquid at room temperature are worked up to give a liquid, emulsifiable preparation with the aid of 25 parts of a surface active emulsifier of the alkylphenylpolyglycol ether series and 50 parts of xylene.

The following Examples I–VII and Tables 1–9 illustrate the carrying out of the process of the present invention and also show the effectiveness of the preparations of the invention.

EXAMPLE I

Fungicidal contact effect with barley

Young potted barley plants 6–8 cm. in height were immersed in an emulsion or suspension of any one of the active agents enumerated in Tables 1 and 2 in such a way that the pots were not wetted. The resulting layer of active agent was then allowed to dry out and the plants were dusted with conidia of *Erysiphe graminis*. 5 days after this infection the results were determined. The values listed in Table 3 given below were determined.

In Tables 3 to 7 the effect was evaluated using the following scale:

0=no effect; all leaves strongly affected.

3=weak effect; more than half the leaves strongly affected.

6=medium to good effect; less than half the leaves moderately affected.

9=very good effect; at most few of the leaves slightly affected.

TABLE 3

| Compound No. | Concentration of the emulsion or suspension of active agent in percent | Effect |
|---|---|---|
| 3 | 0.2 / 0.5 | 9 / 6 |
| 8 | 0.05 | 9 |
| 6 | 0.2 | 9 |
| 2 | 0.05 | 6 |
| 11 | 0.2 | 6 |
| 12 | 0.2 | 9 |
| 14 | 0.2 / 0.05 | 6 / 6 |
| 15 | 0.2 / 0.05 | 9 / 6 |
| 16 | 0.2 / 0.05 | 6 / 6 |
| 17 | 0.2 / 0.05 | 9 / 9 |
| 18 | 0.2 | 9 |
| 19 | 0.2 | — |
| 20 | 0.05 / 0.2 / 0.05 | 9 / 9 / 6 |
| 21 | 0.2 / 0.05 | 9 / 6 |
| 22 | 0.2 / 0.05 | 9 / 6 |
| 30 | 0.2 / 0.05 | 9 / 9 |
| 31 | 0.2 / 0.05 | 9 / 9 |
| 32 | 0.2 / 0.05 | 6 / 6 |
| 33 | 0.2 / 0.05 | 6 / 9 |
| 34 | 0.2 / 0.05 | 9 / 6 |
| 35 | 0.2 / 0.05 | 9 / 9 |
| 36 | 0.2 / 0.05 | 9 / 9 |
| 37 | 0.2 / 0.05 | 9 / 6 |
| 38 | 0.2 / 0.05 | 9 / 6 |
| 39 | 0.2 / 0.05 | 9 / 6 |
| 40 | 0.2 / 0.05 | 9 / 6 |
| 42 | 0.2 / 0.05 | 9 / 6 |
| 43 | 0.2 / 0.05 | 9 / 6 |
| 44 | 0.2 / 0.05 | 9 / — |
| 45 | 0.2 / 0.05 | 6 / 6 |
| 46 | 0.2 / 0.05 | 9 / 9 |
| 47 | 0.2 / 0.05 | 9 / 6 |
| 48 | 0.2 | 9 |
| 49 | 0.2 | 6 |
| None added | 0 | 0 |

EXAMPLE II

Fungicidal contact effect with vines

Young potted vines with 5–7 leaves (variety "Gutedel") were sprayed with a suspension or emulsion of any one of the active agents enumerated in Table 1. After drying of the resulting covering, the plants were infected with spores of *Plasmopara viticola*, kept for 8 days in 100% relative humidity, whereupon the damage was evaluated. The results are shown in the following Table 4.

TABLE 4

| Compound No. | Concentration of the suspension in percent | Effect |
|---|---|---|
| 4 | 0.1 / 0.05 / 0.025 | 9 / 8 / 8 |
| 2 | 0.1 | 9 |
| None added | 0 | 0 |

EXAMPLE III

Fungicidal contact effect with potatoes

Young potted potato plants (variety "Bintje") with about 13 small leaves were sprayed with a suspension of any one of the active agents enumerated in Table 1. After drying of the active agent, the plants were infected with spores of *Phytophtora infestans* and subsequently kept at 16° C. and 100% relative humidity. After 6 days the damage was evaluated. The results are shown in the following Table 5.

TABLE 5

| Compound No. | Concentration of the suspension in percent | Effect |
|---|---|---|
| 4 | 0.05 / 0.025 | 9 / 9 |
| 2 | 0.05 | 9 |
| None added | 0 | 0 |

EXAMPLE IV

Fungicidal systemic effect with barley

Young potted barley plants of height 6–8 cm. were sprinkled with 20 ml. of a suspension of any one of the active agents enumerated in Tables 1 and 2 in such a way that the green part of the plant did not come into contact with the liquor. After 24 hours the plants were infected with conidia of *Erysiphe graminis*. After a further 5 days the damage was evaluated. The results are shown in the following Table 6.

TABLE 6

| Compound No. | Concentration in the suspension of active agent in percent | Effect |
|---|---|---|
| 4 | 0.2 | 9 |
| 2 | 0.2 | 9 |
| 5 | 0.2 | 6 |
| 1 | 0.2 | 6 |
| 14 | 0.2 / 0.05 | 6 / 6 |
| 15 | 0.2 / 0.5 | 9 / 6 |
| 16 | 0.2 | 9 |
| 18 | 0.2 / 0.05 | 6 / 3 |
| 19 | 0.2 | 6 |
| 20 | 0.2 / 0.05 | 9 / 6 |
| 21 | 0.2 / 0.05 | 9 / 9 |
| 30 | 0.2 / 0.05 | 9 / 9 |
| 31 | 0.2 / 0.05 | 9 / 9 |
| 32 | 0.2 / 0.05 | 9 / 9 |
| 33 | 0.2 / 0.05 | 9 / 6 |
| 34 | 0.2 | 9 |
| 35 | 0.2 / 0.05 | 9 / 9 |
| 36 | 0.2 / 0.05 | 9 / 9 |
| 37 | 0.2 / 0.05 | 9 / 9 |
| 38 | 0.2 / 0.05 | 9 / 6 |
| 39 | 0.2 / 0.05 | 9 / 6 |
| 40 | 0.2 / 0.05 | 6 / 6 |
| 41 | 0.2 | 6 |
| 42 | 0.2 | 6 |
| 43 | 0.2 / 0.05 | 9 / 9 |
| 45 | 0.2 | 6 |
| 46 | 0.2 / 0.05 | 9 / 9 |
| 47 | 0.2 | 6 |
| 48 | 0.2 | 6 |
| 49 | 0.2 | 9 |
| None added | 0 | 0 |

EXAMPLE V

Fungicidal systemic effect with beans

Potted bean plants (*Phaseolus vulgaris*) with 2 primary leaves were sprinkled with 70 ml. of a suspension of the active agents enumerated in Table 1 in such a way that the green parts of the plants remained untouched. After 24 hours the plants were infected with spores of *Uromyces phaseoli*, kept for 2 days at 100% relative humidity and subsequently for 10 days under normal laboratory conditions under artificial lighting, whereupon the damage was evaluated. The following Table 7 shows the results obtained.

TABLE 7

| Compound No. | Concentration in the suspension of active agent in percent | Effect |
|---|---|---|
| 4 | 0.1 | 9 |
|   | 0.025 | 9 |
|   | 0.0125 | 7 |
| 2 | 0.025 | 9 |
| None added | 0 | 0 |

EXAMPLE VI

Acaricidal contact effect with beans

Blanked out leaf discs of bean leaves of 2 cm. diameter were covered each with 20–30 mites of a non-resistant wild strain of *Tetranychus telarius* in the stage of larvae III and adult stage. 3 leaf discs each were immersed for 3 seconds in a suspension or emulsion produced as above containing any one of the active agents mentioned in Tables 1 and 2 above, and placed in a Petri dish with moist filter paper; the dish cover was applied at an angle so that quick drying out on slight aeration was avoided. After 48 hours alive and dead mites were counted and the mortality was stated as a percentage. According to this method the following results were obtained:

TABLE 8

| Compound No. | Concentration, percent | Mortality, percent |
|---|---|---|
| 10 | 0.05 | 100 |
| 9 | 0.05 | 90 |
| 6 | 0.0125 | 100 |
| 7 | 0.0125 | 100 |
| 8 | 0.0125 | 100 |
| 23 | 0.05 | 100 |
|    | 0.0125 | 100 |
| 24 | 0.05 | 100 |
|    | 0.0125 | 100 |
| 25 | 0.05 | 100 |
|    | 0.0125 | 100 |
| 29 | 0.05 | 100 |
| 50 | 0.05 | 95 |
|    | 0.0125 | 90 |
| 51 | 0.0125 | 100 |
| 52 | 0.0125 | 100 |
| 53 | 0.0125 | 100 |
| 54 | 0.0125 | 100 |
| 55 | 0.0125 | 100 |

EXAMPLE VII

Ovicidal contact effect with beans

Bean leaves covered with eggs of *Tetranychus telarius* were immersed for 3 seconds in an emulsion produced as described above containing 0.0125% of a compound described in Tables 1 or 2 above; the treated leaves were allowed to dry, their stem inserted in a small tube filled with water and kept in a Petri dish of 14 cm. diameter. After 6–7 days the number of hatched eggs was counted and the ovicidal effect stated as a percentage of the eggs destroyed. In this way the following results were obtained:

The ranges of compounds (I) to be incorporated into compositions intended to be sold commercially as concentrated products are, by weight, about 20 to about 80%, preferably 50 to 80%, in the case of wettable powders, and about 20 to about 50%, preferably 30 to 50%, in the case of solutions, e.g. of the free base in an organic solvent or of a salt of the free base in water.

Inert solid carriers for the compositions of the invention are, e.g., kaolin, silicic acid gel, talc and aluminium oxides; suitable liquid carriers are, e.g., aromatic and optionally chlorinated hydrocarbons (for instance toluene, xylene and commercially available mixtures of aromatics). Emulsifying agents are, e.g., alkenyl-, alkyl-, monoalkylaryl- and dialkylarylpolyglycol ethers with about 10 to 40 ethylene oxide units and about 12 to 22 carbon atoms in the hydrophobic residue.

For the application of the compounds of Formula I as pesticidal products on fields concentrations of 0.02 to 1.0% by weight are convenient. The concentrations in the tables 3 to 9 relate to trials made in the laboratory.

The compounds Nos. 1, 3, 4, 6, 7, 9 to 14, 16 to 18 and 21 in the above tables and their salts are new.

The following are examples of substituted alkyl radicals for $R_1$ and $R_2$ in Formula I: aralkyl (e.g. phenylalkyl), alkyl substituted by a heterocyclic ring (e.g. containing one or two oxygen atoms) or by an alicyclic ring.

The following alkenyl radicals are examples of suitable values for $R_1$ and $R_2$ in Formula I: $CH_2=CH-$, $CH_3-CH=CH-CH_2-$, $n=C_4H_9-CH=CH-$, sec.$=C_3H_7-CH=CH-n=C_4H_9-$,
$CH_2=CH-n=C_{16}H_{35}-$ The following are examples of suitable substituted alkenyl radicals for $R_1$ and $R_2$ in Formula I: aralkenyl (e.g. phenylalkenyl), alkenyl substituted by a heterocyclic ring (e.g. containing one or two oxygen atoms) or by an alicyclic ring.

We claim:

1. A compound of the formula:

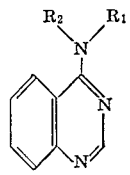

wherein:

$R_1$ represents alkyl of from 7 to 14 carbon atoms or alkenyl of up to 18 carbon atoms; and $R_2$ represents hydrogen, alkyl of from 7 to 14 carbon atoms or alkenyl of up to 18 carbon atoms, or an acid addition salt thereof.

2. A compound of claim 1 wherein $R_2$ is hydrogen and $R_1$ is as defined.

3. A compound of claim 1 wherein $R_1$ is alkyl of from 7 to 14 carbon atoms and $R_2$ is hydrogen or alkyl of from 7 to 14 carbon atoms.

4. The compound of claim 2 which is 4-n-dodecylaminoquinazoline.

References Cited

FOREIGN PATENTS 822,069  10/1959  Great Britain.

OTHER REFERENCES

Higashino; Chem. Abstracts, 55:5516b (1961).

ALEX MAZEL, Primary Examiner

R. J. GALLAGHER, Assistant Examiner

U.S. Cl. X.R.

260—565; 424—251